United States Patent
Fiedler (10) Patent No.: US 7,890,478 B2
(45) Date of Patent: Feb. 15, 2011

(54) PROJECTED BUSINESS OBJECTS

(75) Inventor: Thomas Fiedler, Pfinztal (DE)

(73) Assignee: SAP AG, Walldorf (DE)

( * ) Notice: Subject to any disclaimer, the term of this patent is extended or adjusted under 35 U.S.C. 154(b) by 501 days.

(21) Appl. No.: 11/408,929

(22) Filed: Apr. 24, 2006

(65) Prior Publication Data

US 2007/0250481 A1    Oct. 25, 2007

(51) Int. Cl.
G06F 7/00    (2006.01)
G06F 3/00    (2006.01)

(52) U.S. Cl. .................... 707/694; 715/755

(58) Field of Classification Search ........... 707/102, 707/104.1
See application file for complete search history.

(56) References Cited

U.S. PATENT DOCUMENTS

| | | | |
|---|---|---|---|
| 7,266,565 B2 * | 9/2007 | Diab | 707/102 |
| 7,287,037 B2 * | 10/2007 | An et al. | 707/102 |
| 7,302,431 B1 * | 11/2007 | Apollonsky et al. | 707/10 |
| 2002/0049603 A1 * | 4/2002 | Mehra et al. | 705/1 |
| 2002/0169650 A1 * | 11/2002 | Dougherty et al. | 705/8 |
| 2002/0184070 A1 * | 12/2002 | Chen et al. | 705/9 |
| 2003/0135584 A1 * | 7/2003 | Roberts et al. | 709/218 |
| 2004/0225674 A1 * | 11/2004 | Benson et al. | 707/102 |
| 2004/0243453 A1 * | 12/2004 | Call et al. | 705/7 |
| 2004/0268229 A1 * | 12/2004 | Paoli et al. | 715/508 |
| 2005/0021348 A1 * | 1/2005 | Chan et al. | 705/1 |
| 2005/0050141 A1 * | 3/2005 | An et al. | 709/203 |
| 2005/0065966 A1 * | 3/2005 | Diab | 707/102 |
| 2005/0108684 A1 * | 5/2005 | Sohn et al. | 717/120 |
| 2005/0240354 A1 * | 10/2005 | Mamou et al. | 702/19 |
| 2005/0262189 A1 * | 11/2005 | Mamou et al. | 709/203 |
| 2006/0036687 A1 * | 2/2006 | Wood et al. | 709/204 |
| 2006/0070024 A1 * | 3/2006 | Park | 717/106 |
| 2006/0136428 A1 * | 6/2006 | Syeda-Mahmood | 707/100 |
| 2006/0150107 A1 * | 7/2006 | Leung et al. | 715/745 |
| 2006/0179028 A1 * | 8/2006 | Bram et al. | 706/47 |
| 2006/0212543 A1 * | 9/2006 | O'Farrell et al. | 709/219 |
| 2006/0242162 A1 * | 10/2006 | Conner et al. | 707/100 |
| 2007/0094509 A1 * | 4/2007 | Wei et al. | 713/176 |
| 2007/0100945 A1 * | 5/2007 | Bohle et al. | 709/206 |
| 2007/0179793 A1 * | 8/2007 | Bagchi et al. | 705/1 |
| 2008/0126410 A1 | 5/2008 | Brunswig et al. | |
| 2009/0044103 A1 * | 2/2009 | Chalecki et al. | 715/234 |

* cited by examiner

Primary Examiner—Neveen Abel Jalil
Assistant Examiner—Tarek Chbouki
(74) Attorney, Agent, or Firm—Mintz, Levin, Cohn, Ferris, Glovsky & Popeo, P.C.

(57) ABSTRACT

A computer-readable medium including instructions for performing a method for implementing a reusable template entity within a software system. The method includes retrieving a template entity from a repository in response to a request, wherein the template entity contains a plurality of elements related to a plurality of roles associated with the template entity and determining, based on metadata related to the at least one template entity and the request, a list of elements from the plurality of elements to undergo state modification. The method further includes adapting the template entity according to the list of elements to yield a projected entity and providing an instance of the projected entity.

12 Claims, 7 Drawing Sheets

PROJECTED BUSINESS OBJECTS

BACKGROUND

1. Field of the Invention

The present invention relates generally to objected-oriented systems and, more particularly, to projection of full featured business objects.

2. Description of the Related Art

There is, and will continue to be, advances and changes in how enterprises conduct business. Whether these advances and changes occur through growing competition and globalization, mergers and acquisition, or a revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, represents a self-contained, self-describing piece of application functionality that can be found and accessed by other applications. A service is self-contained because the application using the service does not have to depend on anything other than the service itself, and self-describing because all the information on how to use the service can be obtained from the service itself. The descriptions are centrally stored and accessible through standard mechanisms.

Instead of requiring programmers to establish and maintain links between applications, services are loosely coupled, making connections simpler and more flexible and allowing application architects to more easily find and understand services offered by other cooperative applications. However, the problem that exists with services is that they are often designed to expose functionality of individual applications and thus are too limited to be efficient building blocks for enterprise-wide business processes. A solution to this shortfall has been the migration to a Service Oriented Architecture (SOA). The SOA is an open architecture middleware, which builds on the benefits of services. An example of an SOA can be found in the Enterprise Service Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model).

The SOA enables the abstraction of business objects, modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications, defined as applications that compose functionality and information from existing systems to support new business processes or scenarios.

The SOA also enables the use of an enterprise services repository. The enterprise services repository stores relevant pre-existing enterprise services and makes them available to selected partners and customers. By using the enterprise services repository, these selected partners and customers can use the pre-existing enterprise services to aid in the implementation of new services and corresponding business objects. The term business object represents a physical or logical object of significance to a business, such as a purchase order. An "object" refers to a software bundle of variables (e.g., data) and related methods. For example, in object-oriented programming, an object is a concrete realization (instance) of a class that consists of data and the operations associated with that data.

Object-oriented development may provide applications (e.g., Web services, software applications, software components, software modules, software entities, and the like) with flexible building blocks, or "objects," of enterprise business systems. Such flexible building blocks allow developers to reuse class libraries in other applications for potentially different tasks without the need to duplicate work.

In a service framework (e.g., ESF) that includes service entities, a client can "call" a service entity from a service entity provider through an Application Program Interface (API). As used herein, the term "service framework" refers to a defined support structure in which software systems and applications, such as Web services, can be developed, organized, compiled, deployed, customized, run, and/or executed. A service framework may include computer hardware, computer networks, user interfaces, support programs, code libraries, code repositories, scripting language, or other components to help develop and glue together the different components of one or more software systems or applications. The service entity provider allows the instantiation of business objects in response to the API call. As used herein, the term "instantiate" means, in an object oriented programming (OOP) environment, to allocate in memory or other suitable location, an object of a particular class, and, more generally, may include deploying, customizing, running and/or executing an application.

Business objects are frequently utilized in conjunction with other business objects based on relationships between the objects. For example, in the real world, a person may have a name and a home address. Business objects may model this as a person class with a name field and an address class including fields for address information separate from the person business object. The address object may be said to be "linked" or "related" to the person object. Design and development of business objects typically requires significant time in order to accurately model and perform such real-world business processes, particularly more complex scenarios. The complexity of business object development may be increased significantly when a business object must function in multiple roles within an application or applications.

Figure 1A:
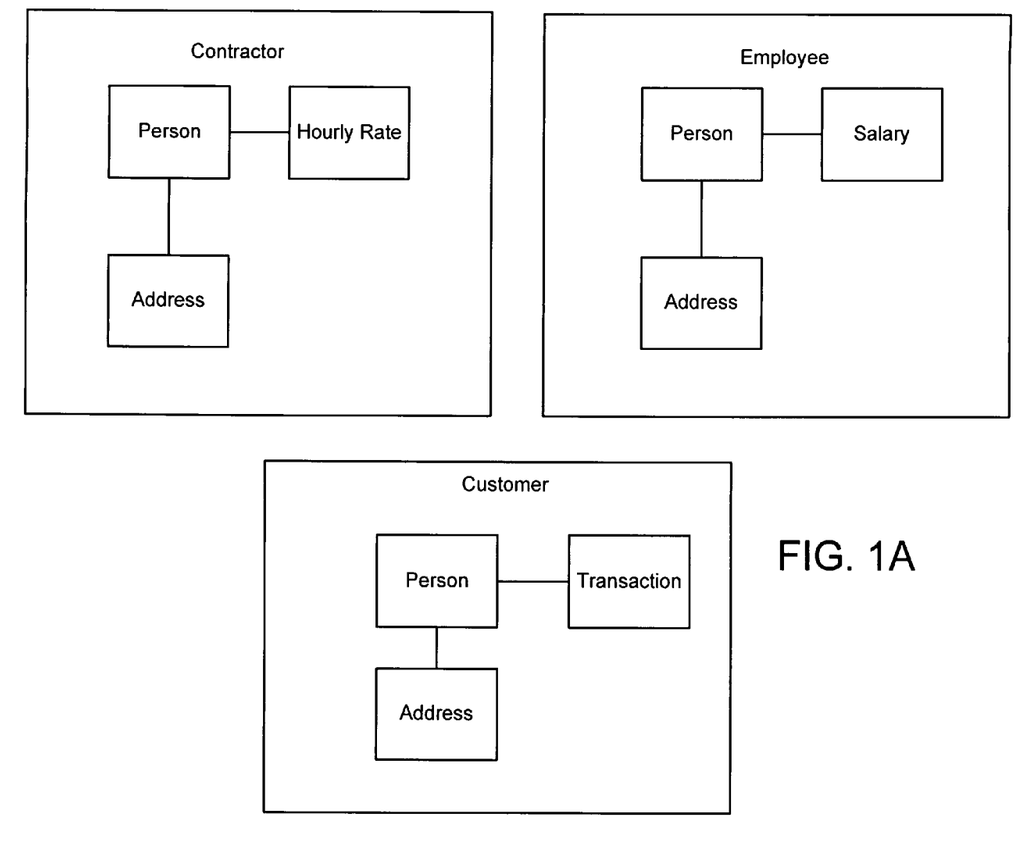
FIG. 1A depicts one exemplary scenario where a single business object may be useful for many different roles.

Many business objects may be utilized in multiple roles. FIG. 1A depicts one exemplary scenario where a single business object may be useful for many different roles. For example, a person modeled as a contractor for a company may also appear as an employee of that company (he works for the company), a supplier to the company, and a customer of the company (e.g., where the person also purchases from the company). The different roles share common data such as the person's name and telephone number, but the person object also has multiple role specific data. For example, data associated with an hourly rate for a contractor may be important in the person's capacity as a contractor (i.e., a supplier to the company), but such data may be substantially irrelevant in the person's capacity as a customer of the company.

Business objects that associate with other objects typically utilize different relationships based on the current role in which the business object is functioning. For example, the person above acting in a contractor role may have an association to a contract object containing the terms of the contract. In another example, the person acting in a capacity as a customer may be associated with multiple transactions for goods and services. In both examples, the data for the person remains the same, but the role related data may differ substantially. Because a single instance of a business object may be required to function in multiple roles concurrently within the same user interface, business object design may become a confusing scenario for a user attempting to craft a reusable object architecture.

In addition to role related data, behaviors of business objects may vary depending on the role in which they are functioning. For example, the algorithm used to check the validity of a contractor's contract terms may be different from the logic used to check a purchase order for a customer. In another example, queries used to insert contract data into a database may, and likely will be, completely different from those used to insert records related to purchased goods. This may lead to further confusion and difficulty for an architect attempting to create a reusable object architecture.

Implementation of business objects in such varying roles has typically led to a user developing multiple business objects with functionality and data related to a particular role. For example, a person acting as a contractor for a company may be modeled within a "contractor" class. That same person acting as an employee of the company may be modeled within an "employee" class, yet in both examples, the person is still a person acting in different roles. Such design can lead to substantial confusion and additional work when trying to model business processes within the SOA.

Further, substantial design and programming skills have been required to adequately model and code business objects for use in particular enterprise systems. When designer and programmer resources are being utilized for other projects, it may slow the development of other critical systems.

In the view of the foregoing, there is a need for systems and methods that assist users working within an SOA to efficiently utilize reusable business objects to model enterprise wide methodologies. Further, there is a need to simplify the architecting of such systems within an SOA such that users with minimal programming and development skills may model and create an enterprise system without compromising the flexibility of reusable objects.

The present disclosure is directed at overcoming one or more of the problems or disadvantages discussed above.

SUMMARY OF THE INVENTION

Consistent with embodiments of the invention, a computer-readable medium including instructions for performing a method for implementing a reusable template entity within a software system is provided. The computer-readable medium includes instructions for retrieving a template entity from a repository in response to a request, wherein the template entity contains a plurality of elements related to a plurality of roles associated with the template entity and determining, based on metadata related to the at least one template entity and the request, a list of elements from the plurality of elements to undergo state modification. The computer-readable medium further includes instructions for adapting the template entity according to the list of elements to yield a projected entity and providing an instance of the projected entity.

In another embodiment, a method for implementing a reusable template entity within a software system is provided. The method includes the steps of retrieving a template entity from a repository in response to a request, wherein the template entity contains a plurality of elements related to a plurality of roles associated with the template entity and determining, based on metadata related to the at least one template entity and the request, a list of elements from the plurality of elements to undergo state modification. The method further includes the steps of adapting the template entity according to the list of elements to yield a projected entity and providing an instance of the projected entity.

In yet another embodiment, a system for implementing a reusable template entity is provided. The system includes a receiving component configured to receive a request for a business entity from a requester. The system also includes a processor configured to retrieve from a repository, at least one template entity in response to a request, wherein the at least one template entity contains a plurality of elements related to a plurality of roles associated with the template entity and determine, based on metadata related to the at least one template entity, a list of elements from the plurality of elements to undergo state modification. The system further includes a service adaptor configured to adapt the template entity according to the list of elements to yield a projected entity and provide an instance of the projected entity.

It is to be understood that both the foregoing general description and the following detailed description are exemplary and explanatory only, and should not be considered restrictive of the scope of the invention, as claimed. Further, features and/or variations may be provided in addition to those set forth herein. For example, embodiments consistent with the present invention may be directed to various combinations and sub-combinations of the features described in the following detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1B:
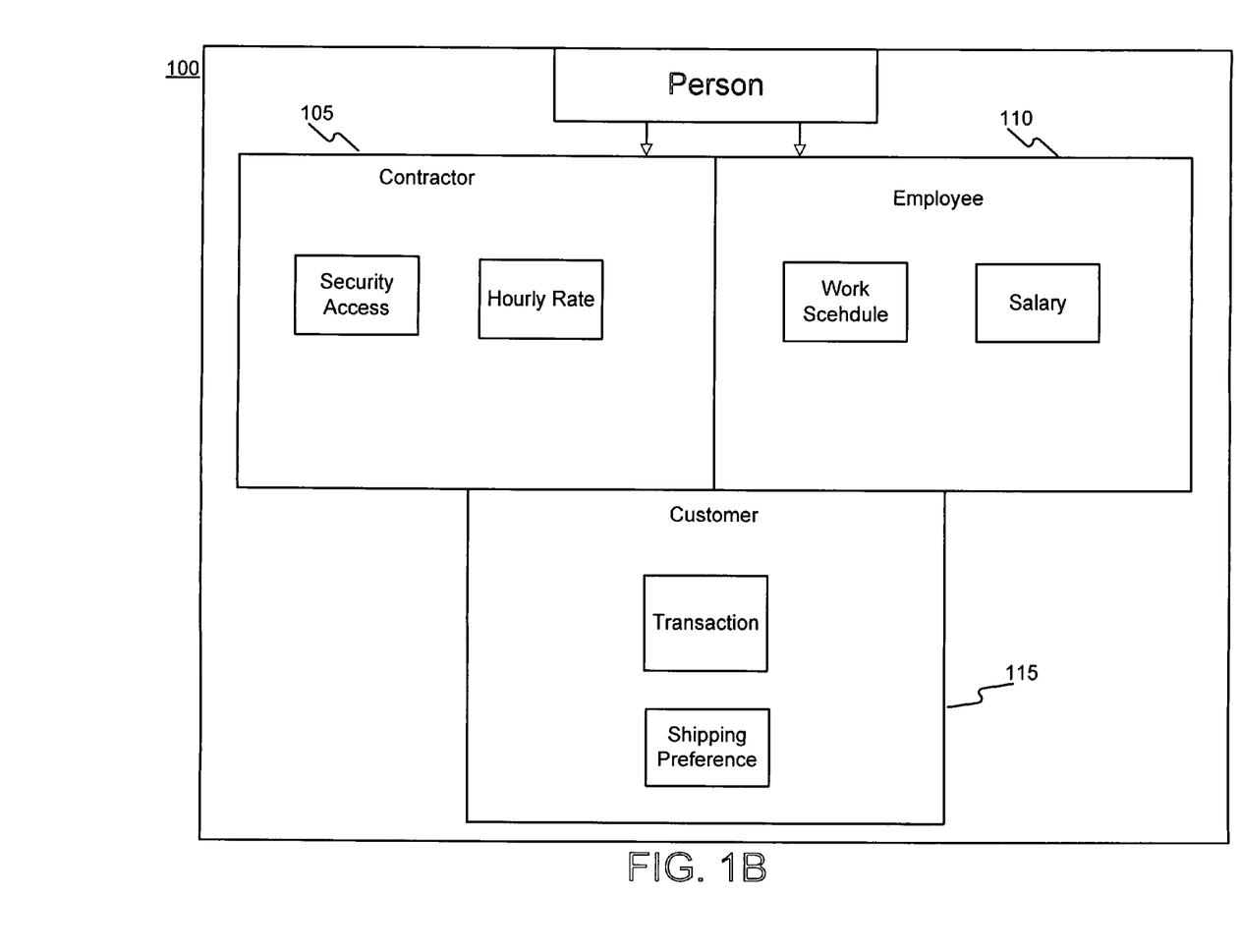
FIG. 1B is an exemplary representation of a "super-class" or template business object relationship schema.

FIG. 1B is an exemplary representation of a "super-class" or template entity relationship schema. A template entity may be a template business object and may contain all ascertained elements for all determined roles in which the template business object may be called upon to function. For example, the person template business object 100 as shown in FIG. 1B contain elements for a person object in a contract role 105, in an employee role 110, and in a customer role 115. All elements associated with a person as a contractor (e.g., contract terms, security access, etc.), as an employee (e.g., salary data, work schedule, etc.), and a customer (e.g., transactions, shipping preferences, etc.) may be included within the template business object. Template business objects will be discussed in greater detail below with reference to FIGS. 3-6.

Figure 2:
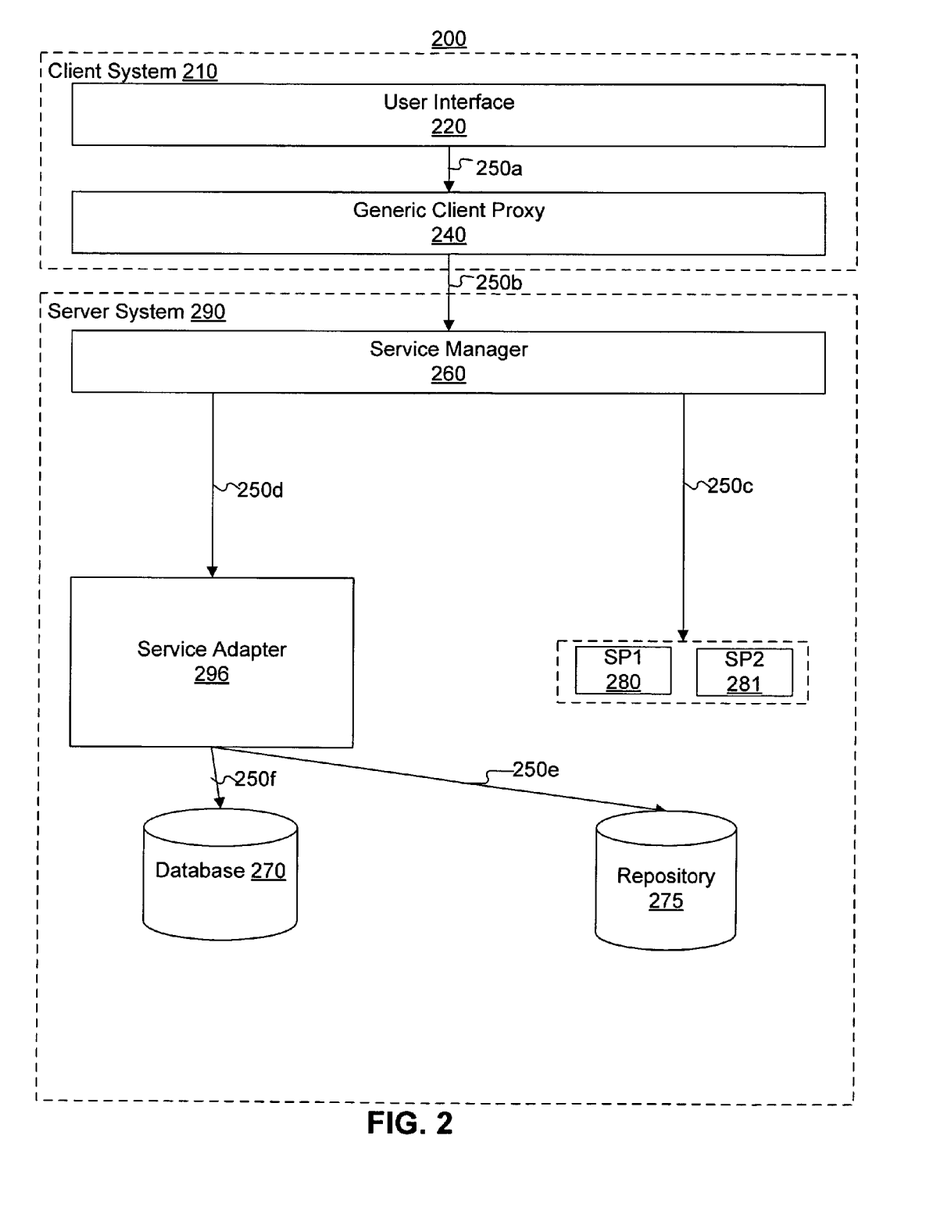
FIG. 2 is a block diagram of an exemplary system for generating and providing template business objects and projections of template business objects.

FIG. 2 is a block diagram of an exemplary system 200 that includes a client system 210 and a server system 290 for generating and providing template business objects as well as projections of template business objects, i.e., projection business objects. By providing template business objects containing elements for functions in all determined roles, users may save substantial time and effort by projecting the template business objects at runtime with elements enabled and/or disabled according to the role in which the object is to function. As such, the template business objects and associated projections may allow development of a system 200, such as the development of object architecture and user interfaces, to proceed much more quickly following design and development of system template business objects. Further, template business objects may be reused in other enterprise systems with new projections defined for each role.

A projection business object may be defined as a template business object instantiated and modified at runtime according to predefined metadata to include only specific elements of the related template business object. For example, a template business object containing multiple elements may have metadata corresponding to a projection of that template business object indicating several elements should be disabled for use in a particular role. At runtime, a projection instantiated according to that metadata would present only the enabled elements for use, according to the metadata. Projection of template business objects will be discussed in greater detail with reference to FIGS. 3-5 below.

Referring to FIG. 2, client system 210 may include a user interface 220 and a generic client proxy 240. Client system 210 may connect to server system 290 through network connection 250b. Server system 290 may further include a service manager 260, a repository 275, a service adapter 296, a database 270, and service providers 280-281. System 200 may be implemented as part of an enterprise services framework (ESF). An enterprise services framework is a type of computer framework, such as a client-server architectural framework, that may include one or more services. The services may be accessible to other parts of the ESF, such as client systems and their corresponding users, through a communication mechanism such as the Internet or an intranet. The ESF may be constructed using tools provided by SAP Netweaver™ (commercially available from SAP AG, Walldorf, Germany). Although FIG. 2 shows a single client system 210 and a single server system 290, a plurality of client systems and server systems may be used. Moreover, the components depicted in FIG. 2 may be distributed among multiple locations. Although FIG. 2 is described with respect to a client-server architecture and an ESF, system 200 can also use any other architecture or framework.

Client system 210 may include one or more processors, such as computers, to interface with server system 290. User interface 220 may provide an interface to allow a user to interact with other applications, such as service providers 280-281 and their corresponding projection business objects. User interface 220 may include a browser to provide content from service providers 280-282. In some implementations, SAP Web Dynpro (commercially available from SAP AG, Walldorf, Germany) is used as a model-based development environment for generating user interface 220, although other development environments can also be used. User interface 220 may call the API of generic client proxy 240 through network connection 250a to, for example, interact with one of the service providers 280-281.

Generic client proxy 240 may have an API implemented at client 210 that is accessible to user interface 220. When instantiated, generic client proxy 240 may provide an interface, such as a Remote Procedure Call (RPC) or SOAP interface, to service manager 260 at server system 290 through network connection 250b. Generic client proxy 240 may be implemented to control the functionality available to user interface 220 by providing a well-defined interface to service manager 260. For example, service manager 260 may include a variety of procedures, but generic client proxy 240 may be allowed access only to a subset of those procedures. Moreover, generic client proxy 240 may buffer requests and/or responses between user interface 220 and service manager 260.

Network connections 250a-250f may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 250a-250f. Moreover, network connections 250a-250f may be embodied using bi-directional, unidirectional, or dedicated communication links. Network connections 250a-250f may also implement standard transmission protocols, such as Transmission Control Protocol/Internet Protocol (TCP/IP), Hyper Text Transfer Protocol (HTTP), SOAP, RPC, or other protocols.

Server system 290 may include one or more processors, such as computers, to interface with other computers, such as client system 290. Generic client proxy 240 calls the API of service manager 260 at server 290. When the API of service manager 260 is called, an instance of the service manager 260 may be created at server system 290. Although service manager is depicted within server 290, service manager 260 can be located anywhere and distributed among multiple locations.

Moreover, when the API of service manager 260 is called, service manager 260 may call a procedure to instantiate one or more of the service providers 280-281. When service provider 280 is instantiated by service manager 260, service provider 280 may also instantiate one or more corresponding projection business objects. For example, user interface 220 may access service provider 280 to interact with information for an employee of the company. The elements associated with providing the employee information to user interface 220 may correspond to a projection business object (e.g., employee is a projection of the "person" template business object in the role of employee). Service provider 280 may then instantiate an employee projection business object and return it to user interface 220. Alternatively, a projection business object may cause instantiation of its related service provider or other service providers.

Data elements within a template business object or a projection business object may be organized into nodes. Returning to the above employee example, a node may refer to a single data element such as a unique identifier, or another object, such as an address or salary information included within the projection business object. Nodes may be constructed using eXtensible Markup Language (XML), HyperText Markup Language (HTML), or any other language suitable for conveying structured data. Node structures, as well as structures of the associated template business objects and projection business objects, may be stored in, for example, database 270 and/or repository 275. As noted above, template business objects and their associated service provider classes may be utilized as a framework to quickly develop and deploy an object architecture based on projections of the available template business objects for use within system 200.

Repository 275 may store information associated with the template business objects, projection business objects, and nodes therein, including metadata and structure. For example, repository 275 may store a list of template business object definitions, the associated nodes including an identifier (ID), and data content. The ID of a node refers to an identifying memory address of a node that uniquely identifies individual nodes within repository 275. The memory address can be used to access and read data content of a particular node. For example, an ID of a node may consist of a directory structure and filename associated with the node. Repository 275 may be implemented as an enterprise services repository, although any other computer-readable storage medium may be used.

Repository 275 may also store metadata regarding one or more projection business objects. Metadata may be defined as data about data. For example, metadata may refer to information about the data itself, such as content, quality, condition, origin, size, formatting, characteristics of data, and the like. XML is a specific example of metadata because it is a format used to define other data objects. Metadata may include a schema. A schema is the organization or structure, such as the organization of a database or the structure of an object in an object oriented program. In object oriented programming, modeling (i.e., the analysis of objects that are used in a business or other context and the identification of the relationships among these data objects) leads to a schema, which can be stored in repository 275 as a schema. The schema can be depicted visually as a structure or a formal text-oriented description (e.g., script). For example, metadata may be in the form of database tables. The metadata may include information such as template business object nodes to be enabled or disabled in a projection business object, the name(s) of the projection business object and associated nodes, fields within nodes to be enabled or disabled within a projection business object, whether a field or node should be read-only, the structure of a node, associations, actions, and default queries within a node, among other things. Creation and use of projected business objects will be discussed in greater detail with reference to FIGS. 3-5.

Figure 3:
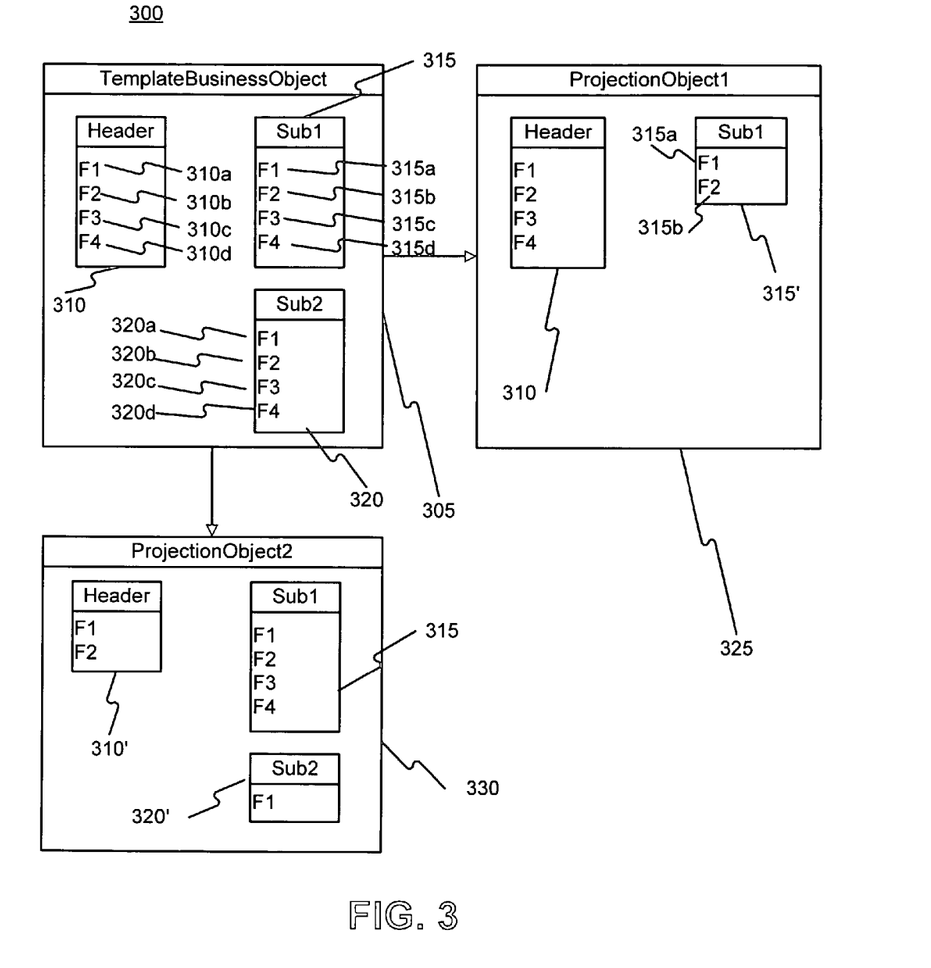
FIG. 3 depicts an exemplary block diagram for a template business object schema and associated projections.

FIG. 3 depicts an exemplary block diagram 300 for a template business object schema and associated projections (i.e., projection business objects). Template business object 305 may model rules and data associated with real-world business processes and entities for roles in which template business object 305 may function. For example, a "person" class may be implemented in many roles (e.g., contractor, customer, and employee). Template business object 305 may be designed and developed to include all data and methods for roles in which the "person" class may be implemented. Additionally, template business object 305 may include, for example, nodes, associations, and queries, among other things, for all roles in which template business object 305 may function.

Template business object 305 may include a single node or multiple nodes and each node may consist of one or more fields. Multiple nodes may be utilized within template business object 305 to represent relationships among other business objects related to roles in which template business object 305 may function. For example, template business object 305 may be a person class as discussed above. In such an example, header node 310 may be the primary node within the person template business object. Header node 310 may include multiple fields such as those represented by fields 310*a-d*. The related fields defining a person may include data such as name, age, and unique identifier, among other things. Further, sub1 node 315, which may also be included within template business object 305, may include the related fields defining the modeled person functioning in the role of a customer. For example, sub1 node 315 may include fields such as transactions, shipping selections, and shopping preferences, among other things. Additional nodes, such as sub2 node 320 and any subsequent nodes (e.g., sub3 node (not shown), sub4 node (not shown), and so forth) may be defined and added to template business object 305 as desired to model a particular business process or entity. Therefore, nodes within template business object 305 may be a function of, for example, the number of roles in which the object may function, the data elements used to model a process or entity, or any other suitable factor.

Fields within nodes may be configured to store additional nodes. In other words, a field of one template business object or projection business object may store another template business object or projection business object. For example, sub2 node 320 may include data related to a person functioning in a role of employee to a company. Within sub2 node 320 are numerous fields 320*a-d*. Field 320*a* may include a unique ID for a salary object while field 320*b* may include a salary node, which actually consists of a salary object containing fields for salary history, tax information, pay period, and any other suitable information. Nodes may be contained within nodes as desired to model a particular business entity or process. In one embodiment the depth to which nodes may be stored within nodes may be limited.

In one embodiment, template business object 305 may have a related service provider class (e.g., template business object service provider (not shown)) providing functional methods and implementations of logical operations (e.g., data confirmation and processing) for roles in which template business object 305 may be utilized. For example, a person template business object may also have a related person service provider class which may include methods and functions for performing address confirmation, e-mail confirmation, etc. Similar to nodes and fields within template business object 305, methods and functions within a service provider class may also be enabled and disabled as desired to model a role in which template business object 305 may function. In one embodiment, a person service provider class may include methods and functions related to a person in the role of a contractor, such as contract term verification functions. Where the person service provider is to be used in the role of a customer, the contract term verification functions may be disabled by a user. A service provider class may also provide queries and other functionality for populating the associated object (e.g., template business object or projection business object) with data from database 270, among other things. One of skill in the art will recognize that any other suitable functions may be provided within a service provider class for a template business object and still fall within the scope of the present disclosure.

In another embodiment, a service provider class for template business object 305 may also be used as a base class for inheritance such that custom functionality may be added to the service provider for a projection business object. In certain systems, it may be desirable to modify available methods and functions to cause actions differing from those embodied within the template business object service provider class. Where this is the case, a programmer may inherit from the template business object service provider class and override existing functions and methods or may create additional methods and function to cause desired actions to be taken. For example, a person template business object service class may contain methods for confirming unique identifier information such as social security numbers. Where social security numbers are not to be used, a developer may inherit from the template business object service provider class and override the method for unique identifier confirmation, specifying a method to use telephone numbers as the unique identifier. It may be noted here that while template service provider classes may be inherited and modified, template business objects should contain all ascertained data elements for all determined functional roles. In other words, a projection business object may not contain a node that is not present within the template business object, but a service provider for a projection business object may contain methods not present in the related template business object service provider.

Projection business object 325 may be derived from template business object 305 and may be defined by metadata stored in repository 275. Projection business objects may be considered children or subsets of template business object 305. In other words, while template business object 305 may be defined with three nodes, 310-320, each containing four data fields (e.g., 310a-d and 320a-d), projection business object 325 may have node 310 with fields 310a-d enabled, but node 320 may be completely disabled and node 315' may be defined as a subset of node 315 having two enabled data fields, 315a and 315b. Returning to the person example from above, a user configuring an enterprise system architecture may determine that template business object 305 functioning in the role of a contractor should include employee info (e.g., node 315), but only two data elements of the employee info are desired (e.g., 315a and 315b) thereby resulting in a projected node of 315'. Likewise, other projection business objects may be defined by enabling and disabling nodes and fields from template business object 305. Projection business object 330 may include the three nodes (e.g., 310, 315, and 320) defined in template business object 305, however, header node 310' may include only fields 310a and 310b enabled in the projection business object. One of skill in the art will recognize that any combination of elements from template business object 305 may be enabled or disabled creating any number of projection business objects for use within system 200.

Figure 4:
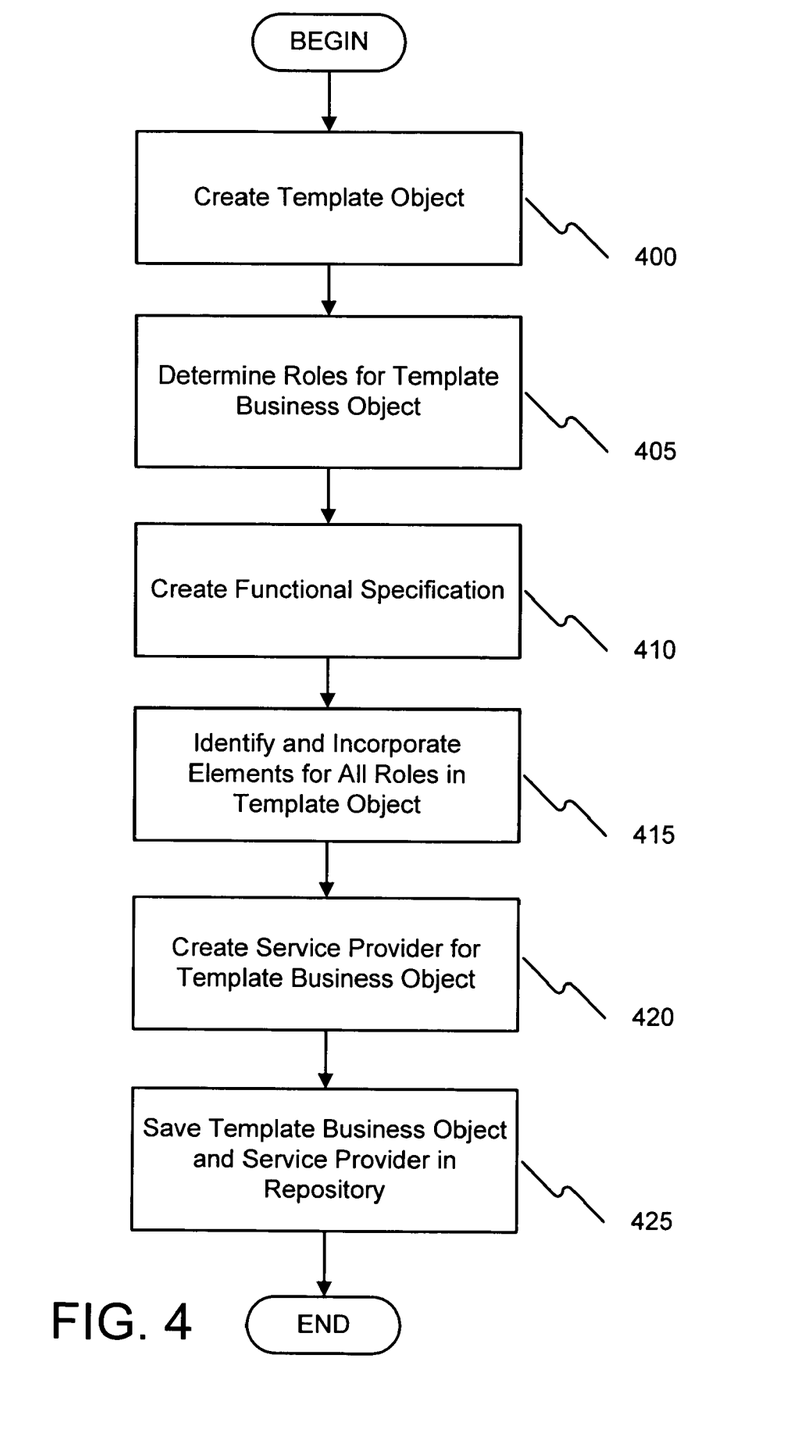
FIG. 4 is a flow diagram demonstrating an exemplary process by which template business objects may be created.

FIG. 4 is a flow diagram demonstrating an exemplary process by which template business objects may be created. In one embodiment, an enterprise system may be built using projections of multiple template business objects. A user may first create a template business object class (step 400). Actions taken during creation of a template business object may include naming the class, specifying its availability and/or security settings, and identifying a storage location, among other things. For example, returning to the "person" example discussed above, a user may create a template business object specifying a name as "person," and indicating the template business object should be available to any system requesting it with storage in repository 275. Alternatively, a template business object may be created as "individual," availability limited to a single system, and stored in database 270. One of skill in the art will recognize that numerous suitable configurations for creation of a template business object may be utilized.

Following creation of the template business object a user may make a determination of roles in which the template business object may be utilized and a list of elements associated with those roles (step 405). Projections of template business objects may be used in multiple roles (e.g., customer, employee, etc.) within software systems to provide data and perform actions on the data, among other things. The number of roles in which a template business object may be utilized may be unlimited or may depend upon the system under development. It may be desired to determine in advance all roles in which the template business object may be utilized to facilitate complete development of the template business object at initial design. For example, a person template business object may function in business capacity as, for example, an employee, a contractor, a purchaser, a supplier, a competitor, etc. Each of these roles may have different relationships, data, and functions associated with them. Therefore, when creating a template business object, all roles may be determined and related data considered. Alternatively, as new systems are developed and new roles determined for a particular template business object, the associated elements may be added to the template business object for use.

Once a list of roles for a template business object has been determined and an element list compiled, a functional specification encompassing behavior of the template business object for each role may be created (step 410). A functional specification may describe actions and functionality that may apply to a template business object in any of the determined roles. Such a description may include queries, methods, actions, functions, etc. that may be used to model business processes and logic, among other things, related to the real-world process modeled with the template business object for all roles in which the template business object may function. For example, a functional specification for a person template business object may include queries for updating personal information, functions for validating personal data, and logic for performing tax calculations on salary data. In certain cases, it may be determined that additional functionality may be desired at a later time, such functionality may then be added to the functional specification and implemented as desired.

Following creation of a functional specification, a user may identify elements associated with a template business object in each role determined, and implement the elements identified (e.g., nodes, fields, functions, methods, etc.) within the created template business object class (step 415). Each determined role may have different elements associated to accurately model the processes applicable to that role. Elements may include, for example, data fields, nodes, and constants, and may be determined through planning, experience, system analysis, or any other suitable method. A survey of elements from an exemplary list of elements for a person object in an employee role may include, name, address, phone, unique identifier, salary, tax exemptions, etc. To this list may be added elements related to a person's role as a customer, a contractor, a supplier, and any other role in which a person may function within a modeled system.

Implementation of the list of elements within a template business object may involve programming or may be performed using a script generating engine based on data tables and user input. As noted, the element list may include data fields, queries for retrieving the data, and functions for populating the data. Computer instructions for each of these elements may be coded by a user within the template business object. Other methods for implementation of the element list may also be used without departing from the scope of the disclosure.

Further, as the elements are implemented, default properties may be specified for each element. For example, state properties may include, enabled/disabled, invisible/visible, and write/read-only. Defaults for such properties may also be set depending on factors such as the frequency of use for a particular element within a template business object, among other things. In so doing, user tasks may be simplified while implementing the template business object as a projection business object for use within a system.

In one embodiment, computer instructions for functions, queries, methods, actions, etc. may be implemented within a template business object service provider class (step 420). In such an embodiment, the service provider class may provide an API for interacting with the template business object. The service provider class may also provide methods for instantiating projections of the template business object, populating the projections, and the like. Operation of the projections, service providers, and template business objects at runtime will be discussed in greater detail with reference to FIG. 6.

Once the list of elements has been implemented, a visual representation of the template business object may resemble a schema. A schema may depict template nodes and how they are associated to one another. Such a schema may be considered a complete representation of a template business object and stored as metadata in repository 275 (step 425). Alternatively, the metadata defining the template business object may be stored in database 270 or any other suitable storage location. Storage of the template business object may allow the template business object to be accessed for editing, projection, and review, among other things. Further, repository 275 or other storage locations may be accessible from other network locations allowing multiple users to access and implement the template business object and its projections in multiple systems. The template business objects may serve to enable the composition of projection business objects and their nodes. The schema may also be used to create additional script for generating code related to the template business objects and/or projection business objects and their associated nodes.

The template business object metadata may be stored with an easily remembered string based name, among other things. For example, a user may name the template business object "Person" to indicate the template business object may be used for processes modeled around people and their associated roles. A unique identifier may also be assigned and may represent a pointer or memory address where the template business object may be located within the storage area. For example, a projection stored in repository 275 may receive a unique identifier which represents the file location where the metadata is stored.

In addition, the template business object may be assigned to a namespace. A namespace is an abstract container, which may be filled by strings including, names, technical terms, and words, among other things. These strings may represent real-world things and may facilitate identification of locations for similar objects. For example, the namespace "System.Custom.Person.*" may represent a namespace where custom system objects related to people are stored. Other methods for assigning unique identifiers and locations are well known in the art and use of such methods will not depart from the scope of the present disclosure.

Figure 5:
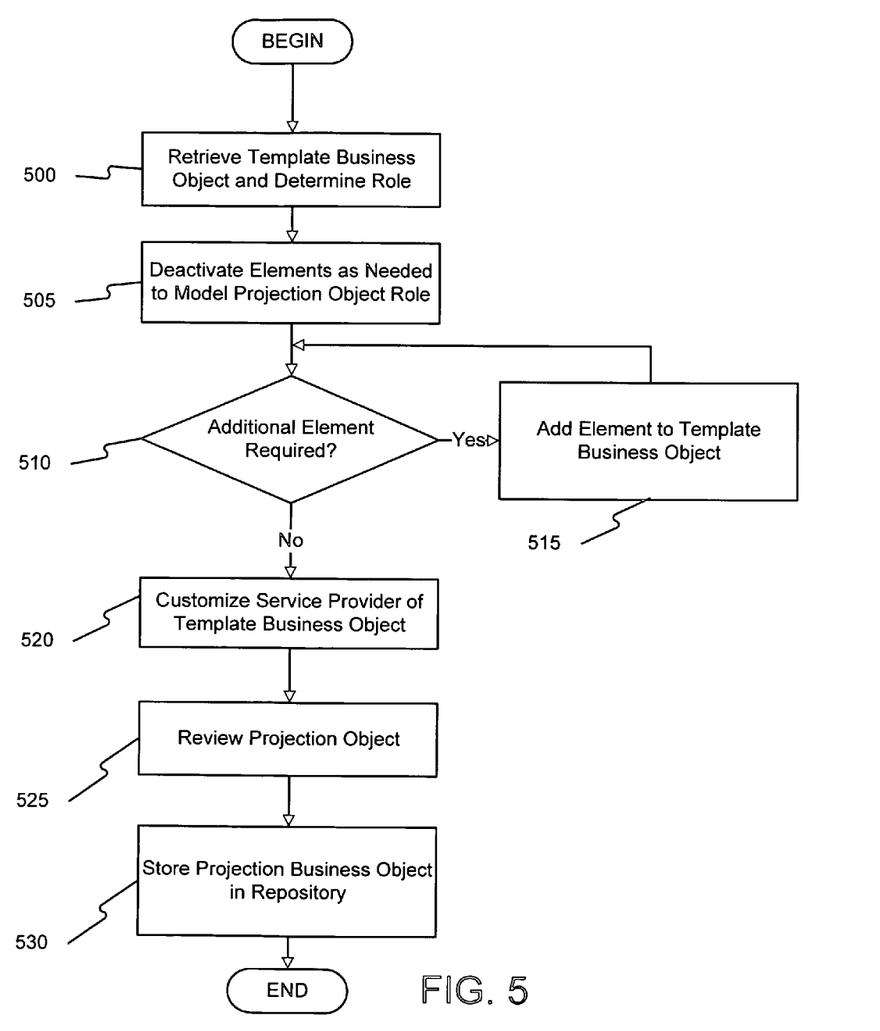
FIG. 5 is a flowchart depicting an exemplary method for creating a projection business object based on a previously defined template business object and a functional role.

FIG. 5 is a flowchart depicting an exemplary method for creating a projection business object based on a previously defined template business object and a functional role. A user creating a software system may have access to many previously defined template business objects, each template business object including elements for all determined roles in which the template business object may function. The user may first select a template business object and identify one particular role for creation of a projection business object (step 500). For example, a user developing a salary reporting system may select a person in the role of an employee of the company. The user may have access to a modeling environment for displaying all available template business objects stored within a particular storage location (e.g., repository 275) and the roles available for that template business object (i.e., roles which have been considered and developed). One such tool may be Integration Builder which is commercially available from SAP AG, Walldorf, Germany. Such a tool may also provide a user interface for editing the template business objects and creating the projection business objects. For example, the tool may provide detailed schema views as well as views for functionality available within a service provider class. Alternatively, the user may be provided a listing of available template business objects and associated roles for use with the software system and may implement the projection business object using other suitable methods.

Once the user has selected a template business object and determined in what role that template business object will function, the user may begin modifying the state of elements within the template business object (step 505). The user may select elements based on their relationship to the template business object and the role in which the projection business object will function. For example, the person template business object may include elements related to roles of employees, contractors, customers, etc. For purposes of a salary reporting system, only the elements related to person in the employee role may be relevant. Therefore, the user may select and disable elements related to roles other than employee within the person template business object. Alternatively, the salary reporting system may use information related to a person functioning in a contractor role as well as an employee. In such a case, the user may enable nodes related to the contractor role as well as those for employee, while disabling other nodes. Further, the user may wish to modify the state of particular elements to read-only or invisible. Such state modifications may also be made while creating or editing the projection business object.

Moreover, element states may default to particular values such as enabled, visible, and read-only based on a template business object's metadata. Such defaults may aid the user in making proper selections for modifications of element states. Alternatively, no default property values may have been specified for the template business object during creation. In such a case the user may enable and disable as desired based on knowledge of the currently developed system.

During the course of element state modification, a user may determine that a particular desired element is absent from the template business object definition (step 510: yes). For example, the user creating the salary reporting system may determine that the person template business object is missing elements related to year-end pay information and that information is desired in the system. In such a case, the user may edit the template business object to include the identified element (step 515) according to steps discussed above in relation to FIG. 4. For example, the user may go back to step 415 and incorporate the newly identified element within the person template business object. The user may be prevented from adding elements to a projection business object, as the template business object should include elements for all determined roles. This may be helpful because a future user may also desire the additional elements, and may use state modification to enable or disable elements as desired.

Alternatively, the user may determine no additional elements are desired because all elements have been included in the template business object (step 510: no). In such a case the user may determine that a custom service provider class may be desirable. Each template business object may have a separate service provider class including functions, methods, queries, etc., related to the template business objects function in multiple roles. A user may inherit from the template business object service provider class and customize functionality within that sub-class as desired (step 520). For example, a method for verifying salary data may be provided in a template business object service provider class, however, a function for determining taxes paid to multiple states may not be available. The user may include a multi-state tax function within the service provider sub-class. The user may also use the service provider sub-class to override functionality within template business object service provider. One of ordinary skill in the art will recognize that other object oriented techniques may be utilized in relation to the service provider sub-class without departing from the scope of the disclosure.

Once the user has completed creation of the projection business object as described above, the user may review the projection business object to determine if the projection business object will function as desired (step 525). The modeling environment may provide a "preview" option that enables the user to preview the schema of the projection business object as it may be implemented at runtime. In other words, the user may view the schema complete with state modifications for each selected element from the list of elements. For example, where the user has disabled all elements in a person template business object except those related to the employee role, the view would appear to be an object modeled strictly for use in an employee role. Only enabled and visible elements may appear within the schema during review mode, thus allowing the user to determine sufficiency of the projection business object.

Following review of the projection business object, a user may store the projection business object for use in the software system (step 530). In one embodiment, the projection business object may be stored in repository 275 or other suitable location (e.g., database 270). In another embodiment, only the differences between the projection business object and the template business object (i.e., the delta) may be stored. For example, where a user has disabled three nodes and seven fields existing in the template business object, only metadata indicating that the projection business object references the base template business object and metadata indicating what nodes and fields from the template business object are disabled may be stored. In this way, storage capacity is maximized by limiting the amount of data stored. Other methods for storing the projection business objects may be used without departing from the scope of the present disclosure.

In yet another embodiment, other actions may also be taken with respect to the projection business object following its creation but prior to storage. For example, a proxy may be generated to provide a representation of the created projection business object. A proxy object may also act as an interface to a template business object. Creation of a proxy for a projection business object may include a consistency check of the template business object and the projection business object prior to creation of the proxy to ensure that changes to the structure of the template business object are limited to the service provider class and state modifications. The proxy may then be created to represent the projection business object as defined in the steps above. The proxy may then be stored in repository 275, database 270, or any other suitable location.

The projection business object or proxy may be stored with a unique identifier as well as an easily remembered string based name. For example, a user may name the projection "Person_Employee_Tax_Reporting" to indicate the person template business object used in the role of an employee for a tax reporting system. A unique identifier may also be assigned to the projection business object. For example, a projection stored in database 270 may receive a unique identifier which represents the primary key of the table storing projection business objects.

In addition, the projection business object or proxy may be assigned to a namespace. For example, the namespace "System.Custom.Person.Projection.Employee.*" may represent a namespace where custom system projection business objects related to a person template business object functioning as an employee are stored. Other methods for assigning unique identifiers and locations are well known in the art and use of such methods will not depart from the scope of the present disclosure.

Figure 6:
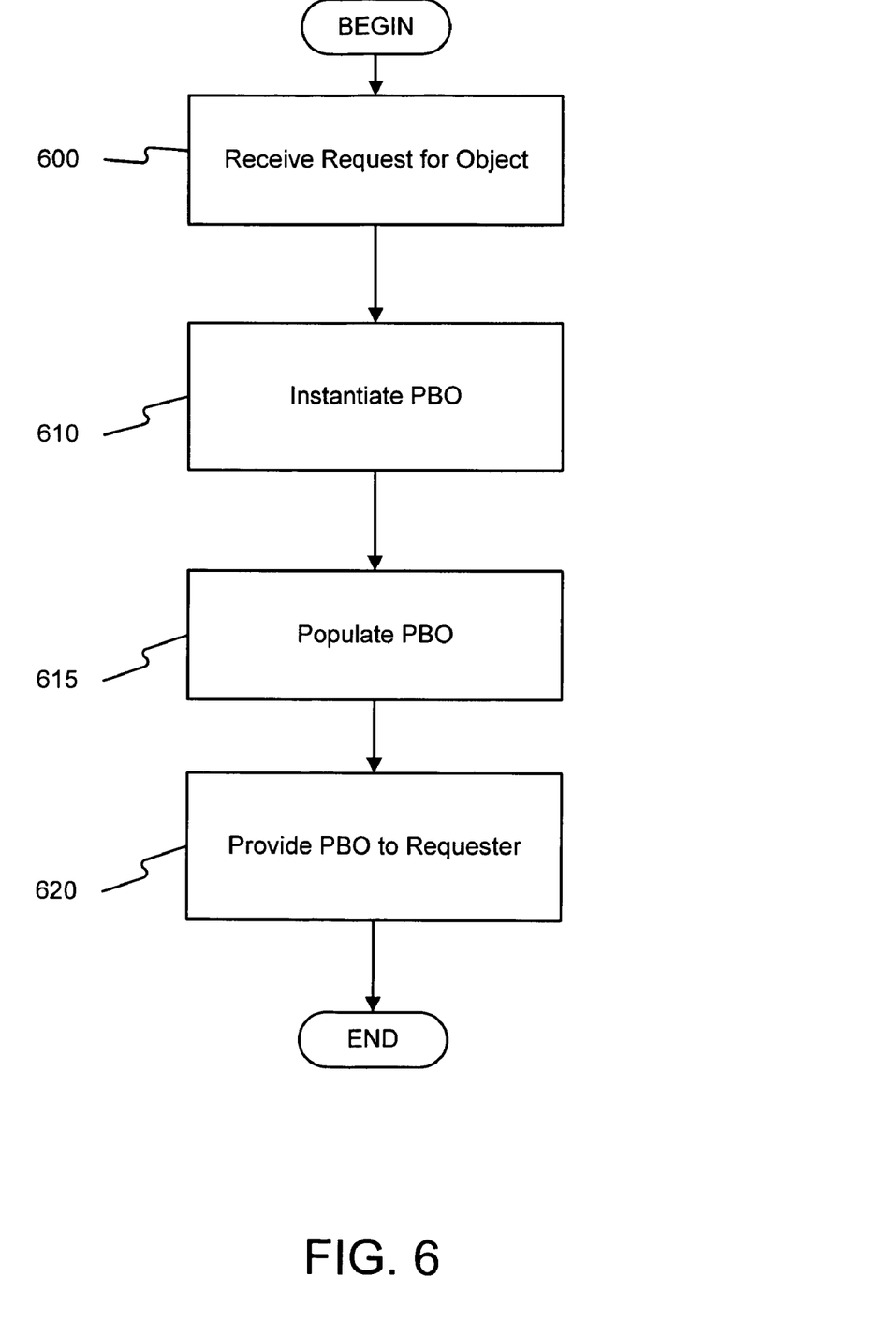
FIG. 6 is a flowchart depicting an exemplary method for implementing a reusable template entity and its associated projections within a software system.

FIG. 6 is a flowchart depicting an exemplary method for implementing a reusable template entity and its associated projections within a software system. During operation, system 200 may make a request for an object (step 600). Such a request may be received by service manager 260, repository 275, database 270, or other component configured to receive an object request. The request may be received using RPC, SOAP, HTTP, TCP/IP, or other protocol and may be received from a service provider object (e.g., service provider 280), user interface 220, or other suitable requester within or outside system 200. The request may contain the unique identifier for the object and/or may use the namespace/name convention in the request. For example, user interface 220 may, in the process of operation, request an employee object using the namespace/name identifier "System.Custom.Person.Employee," for purposes of generating a payroll report. The request may be initiated by a remote procedure call from user interface 220 and received by repository 275. Alternatively, other suitable combinations of requesters and receivers may be utilized Following a request for a projection business object, the receiver may instantiate the projection business object (step 610). For example, repository 275 may include an API, which, when called, may retrieve the metadata for the projection business object as well as the metadata for the related template business object. The API or other suitable component (e.g., service adaptor 296), may then adapt the template business object by applying the properties defined in the projection business object metadata to the template business object. For example, metadata may be stored in repository 275 for a person template business object and an employee projection business object. The repository API may retrieve the employee projection business object metadata and template business object metadata and then apply the projection business object metadata to the template business object metadata by performing actions including, for example, disabling/enabling template business object elements, making template business object elements invisible, and setting template business object elements read-only. Referring back to FIG. 3, application of projection business object metadata to person template business object 305 may result in projection business object 330. Alternatively, service adaptor 296, service manager 260, or any other suitable component may apply the projection business object metadata to its related template business object.

Once the projection business object has been instantiated, the projection business object may communicate with service manager 260 to instantiate a related service provider object (i.e., an instantiation of the related service provider class) to populate the projection business object's data fields and provide functionality (step 615). Projection business object may also communicate with service adaptor 296, or other suitably configured component to instantiate a service provider class. In response to a communication, service manager 260 may instantiate the base service provider related to the parent template business object, or, where a sub-classed service provider has been created for a projection business object, the sub-classed service provider. Service manager 260 may make a determination of which service provider to instantiate based on metadata stored in repository 275, information stored in database 270, or other suitable method.

An instantiated service provider object may perform actions related to populating the projection business object as well as provide functionality related to the projection business object to requesters (e.g., user interface 220). The instantiated service provider may perform actions including, for example, query execution, node updates within the projection business object, and check logic. For example, the service provider for the employee projection business object may query database 270 for information related to the employee projection business object such as, name, date of birth, and address. Upon retrieving the queried data, the service provider may then populate the instance of the employee projection business object by setting the related fields within the employee projection business object to the retrieved data values.

Once the projection business object has been instantiated, populated, and its related service provider instantiated, the projection business object may be provided to the requester (step 620). Requester may include another service provider object (e.g., service provider 281), user interface 220, or other suitable requester within or outside system 200. The projection business object may be provided using RPC, SOAP, HTTP, TCP/IP, or other protocol.

One of ordinary skill in the art will recognize that while the method steps discussed herein were described in a particular order, the order in which the steps are carried out is irrelevant. The steps described herein may be carried out in any order without departing from the scope of the present disclosure.

Other embodiments of the invention will be apparent to those skilled in the art from consideration of the specification and practice of the invention disclosed herein. Therefore, the specification and examples should be considered as exemplary only, with a true scope of the invention being indicated by the following claims.

What is claimed is:

1. A computer-readable storage medium storing executable instructions for performing a method comprising:
   retrieving a template business object from a repository in response to a request, wherein the template business object includes a plurality of elements related to a plurality of roles associated with the template business object, the template business object including: nodes, associations to link the nodes, and queries for the plurality of roles, the plurality of roles associated with a plurality of functions of a user;
   wherein the plurality of elements comprise the nodes, wherein data associated with the plurality of elements are stored in a database separate from the repository including the template business object;
   wherein a portion of the plurality of elements are enabled, at runtime, according to a role and metadata obtained from the repository, and another portion of the plurality of elements are disabled, at runtime, according to the role and the metadata;
   determining, based on the metadata related to the template business object and the request, a list of elements from the enabled portion of the plurality of elements to undergo state modification;
   adapting the template business object according to the list of elements to yield at least one of a plurality of projected entities; and
   providing an instance of the at least one of the plurality of projected entities.

2. The computer-readable storage medium of claim 1, wherein the repository is accessible at a server system via a service manager and a service adapter, wherein the metadata includes at least one of an instruction to enable an element, an instruction to disable an element, an instruction to set an element read only, and an instruction to set an element to invisible.

3. The computer-readable storage medium of claim 2, wherein the adapting step includes at least one of enabling an element, disabling an element, setting an element to read-only, and setting an element to invisible.

4. The computer-readable storage medium of claim 1, further comprising: instantiating a service provider related to the template entity, wherein the service provider is configured to provide data to the projected entity; and establishing a communicative connection between the projected entity and the service provider.

5. A method comprising:
   retrieving a template business object from a repository in response to a request, wherein the template business object includes a plurality of elements related to a plurality of roles associated with the template business object, the template business object including nodes, associations to link the nodes, and queries for the plurality of roles, the plurality of roles associated with a plurality of functions of a user;
   wherein the plurality of elements comprise the nodes, wherein data associated with the plurality of elements are stored in a database separate from the repository including the template business object;
   wherein a portion of the plurality of elements are enabled, at runtime, according to a role and metadata obtained from the repository, and another portion of the plurality of elements are disabled, at runtime, according to the role and the metadata obtained from the repository;
   determining, based on metadata related to the template business object and the request, a list of elements from the enabled portion of the plurality of elements to undergo state modification;
   adapting the template business object according to the list of elements to yield at least one of a plurality of projected entities; and
   providing an instance of the at least one of the plurality of projected entities, wherein at least one of the retrieving, the determining, the adapting, and the providing are performed on at least one processor.

6. The method of claim 5, wherein the metadata includes at least one of an instruction to enable an element, an instruction to disable an element, an instruction to set an element read only, and an instruction to set an element to invisible.

7. The method of claim 6, wherein the adapting step includes at least one of enabling an element, disabling an element, setting an element to read-only, and setting an element to invisible.

8. The method of claim 5, further comprising: instantiating a service provider related to the template entity, wherein the service provider is configured to provide data to the projected entity; and establishing a communicative connection between the projected entity and the service provider.

9. A system comprising:
   at least one processor; and at least one memory, wherein the at least one processor and the at least one memory are configured to provide:

a receiving component configured to receive a request for a template business object; and a processor configured to:

retrieve from a repository, at least one template business object includes in response to the request, wherein the at least one template business object includes a plurality of elements related to a plurality of roles associated with the template business object the template business object including nodes, associations to link the nodes, the plurality of roles associated with a plurality of functions of a user, and query for the plurality of roles, wherein the plurality of elements comprise the nodes, wherein data associated with the plurality of elements are stored in a database separate from the repository including the template business object, wherein a portion of the plurality of elements are enabled, at runtime, according to a role and metadata obtained from the repository, and another portion of the plurality of elements are disabled, at runtime, according to the role and the metadata; and determine, based on metadata related to the template business object the list of elements from the enabled portion of the plurality of elements to undergo state modification; and a service adaptor configured to:

adapt the template business object according to the list of elements to yield at least one of a plurality of projected entities; and providing an instance of the at least one of the plurality of projected entities.

10. The system of claim 9, wherein the metadata includes at least one of an instruction to enable an element, an instruction to disable an element, an instruction to set an element read only, and an instruction to set an element to invisible.

11. The system of claim 9, wherein the service adaptor is configured to perform at least one of enabling an element, disabling an element, setting an element to read-only, and setting an element to invisible.

12. The system of claim 9, further comprising: a service manager configured to: instantiate a service provider related to the template entity, wherein the service provider is configured to provide data to the projected entity; and establish a communicative connection between the projected entity and the service provider.

* * * * *